United States Patent
McGee et al.

(10) Patent No.: US 6,705,278 B2
(45) Date of Patent: Mar. 16, 2004

(54) FUEL INJECTOR WITH MAIN SHOT AND VARIABLE ANCHOR DELAY

(75) Inventors: Brian G. McGee, Chillicothe, IL (US); Matthew R. Roth, Metamora, IL (US); Jason J. Rasmussen, Edwards, IL (US)

(73) Assignee: Caterpillar Inc, Peoria, IL (US)

( * ) Notice: Subject to any disclaimer, the term of this patent is extended or adjusted under 35 U.S.C. 154(b) by 221 days.

(21) Appl. No.: 09/888,581

(22) Filed: Jun. 26, 2001

(65) Prior Publication Data
US 2002/0195081 A1 Dec. 26, 2002

(51) Int. Cl.$^7$ .................................................. F02B 3/00
(52) U.S. Cl. ........................................ 123/299; 123/300
(58) Field of Search ............................... 123/299, 300, 123/480; 701/102, 103, 104

(56) References Cited

U.S. PATENT DOCUMENTS

| | | |
|---|---|---|
| 5,003,944 A | 4/1991 | Moote et al. |
| 5,884,602 A | 3/1999 | Friedrich et al. |
| 5,893,347 A | 4/1999 | McGee et al. |
| 5,901,682 A | 5/1999 | McGee et al. |
| 5,924,403 A | 7/1999 | Thomas |
| 6,032,642 A | 3/2000 | Trumbower et al. |
| 6,125,823 A | 10/2000 | Thomas |
| 6,164,264 A | 12/2000 | Thomas |
| 6,363,314 B1 * | 3/2002 | Hafner et al. ............ 701/104 |
| 6,467,452 B1 * | 10/2002 | Duffy et al. ............. 123/299 |
| 6,480,781 B1 * | 11/2002 | Hafner et al. ........... 701/104 |
| 6,491,018 B1 * | 12/2002 | Duffy et al. ............. 123/299 |

FOREIGN PATENT DOCUMENTS

| | | |
|---|---|---|
| EP | 0691471 A1 | 1/1996 |
| EP | 0978643 A2 | 2/2000 |

* cited by examiner

Primary Examiner—John Kwon

(57) ABSTRACT

An apparatus and method transitions fuel delivery between a first injection characteristic shape and a second injection characteristic shape based on engine operating parameters. The apparatus and method may be adapted to control a fuel injection system, and to operate in at least a split injection mode and a boot injection mode, including steps or means for determining whether an acceleration condition exists, and on the basis of such determination, rapidly changing from a split injection mode to a boot injection mode. This may include a fuel injection control system and/or a controller operative to identify an acceleration condition on the basis of at least one sensed acceleration-related engine operating condition, and to rapidly change the fuel injection mode for at least one fuel injector from the split fuel injection mode to the boot fuel injection mode. The fuel injection control system and/or a controller may also be operable to determine a rail pressure, whether the rail pressure is within a predetermined limit, and on that basis, to modify at least one of a main fuel injection signal timing and an anchor fuel injection signal timing such that a resulting multiple fuel injection has a boot injection shape.

20 Claims, 8 Drawing Sheets

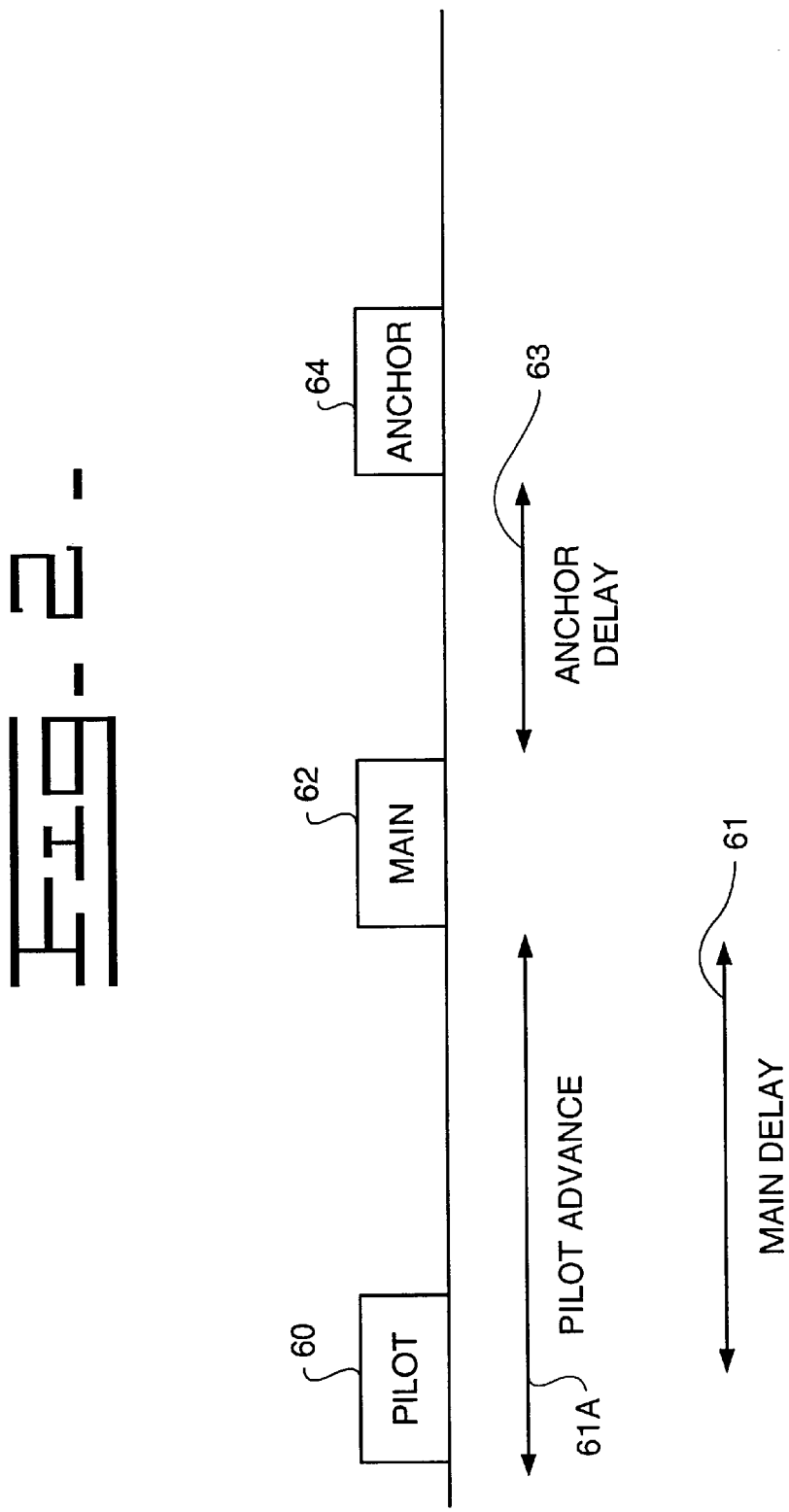

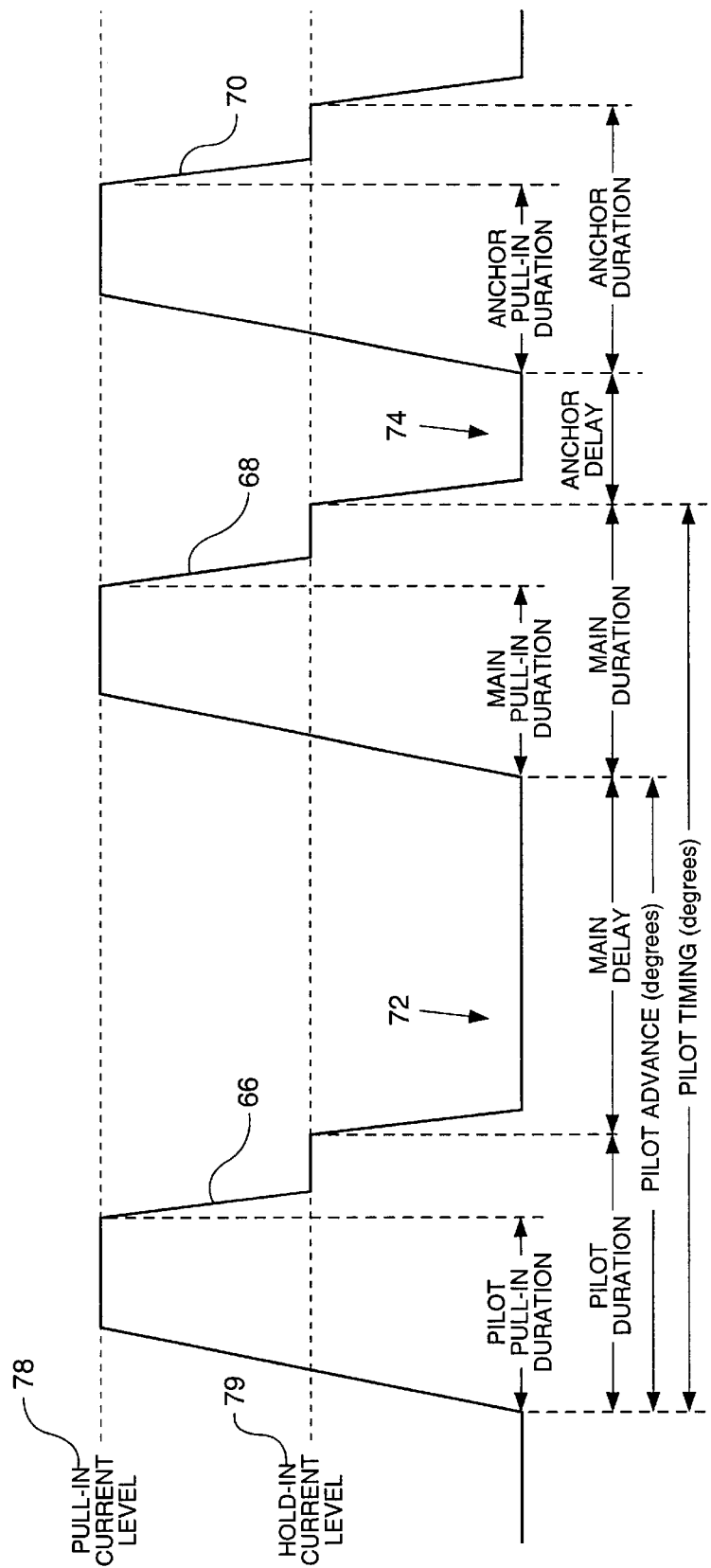

Fig-4A-
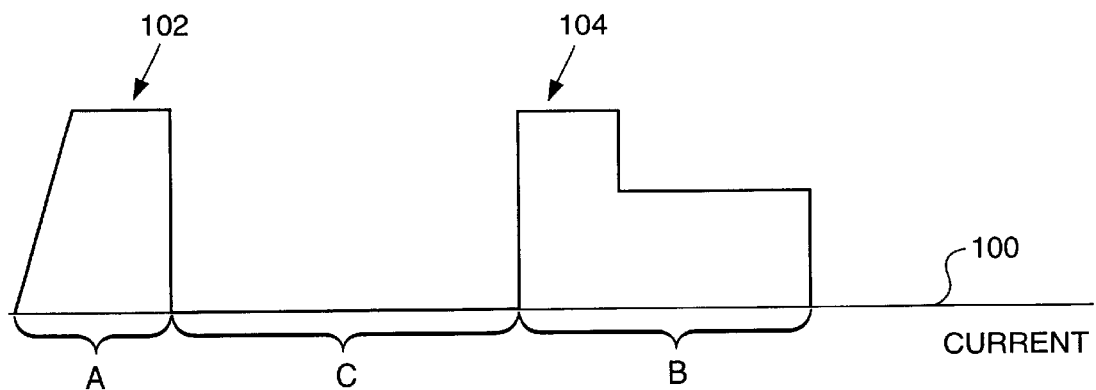
Fig-4B-
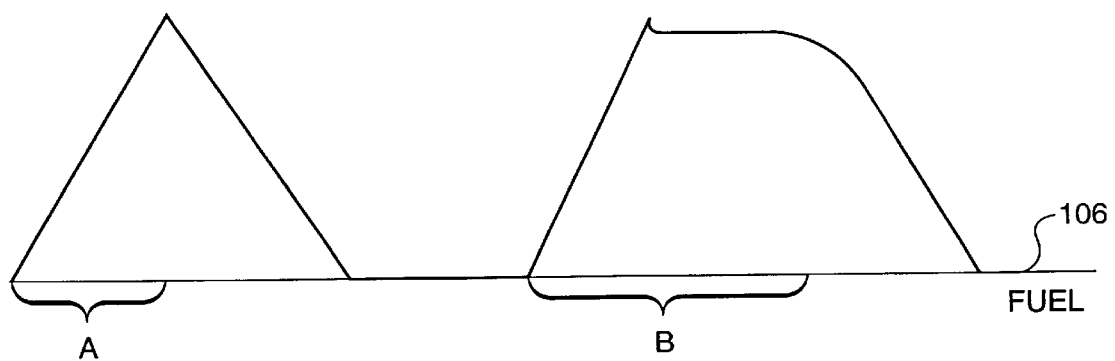

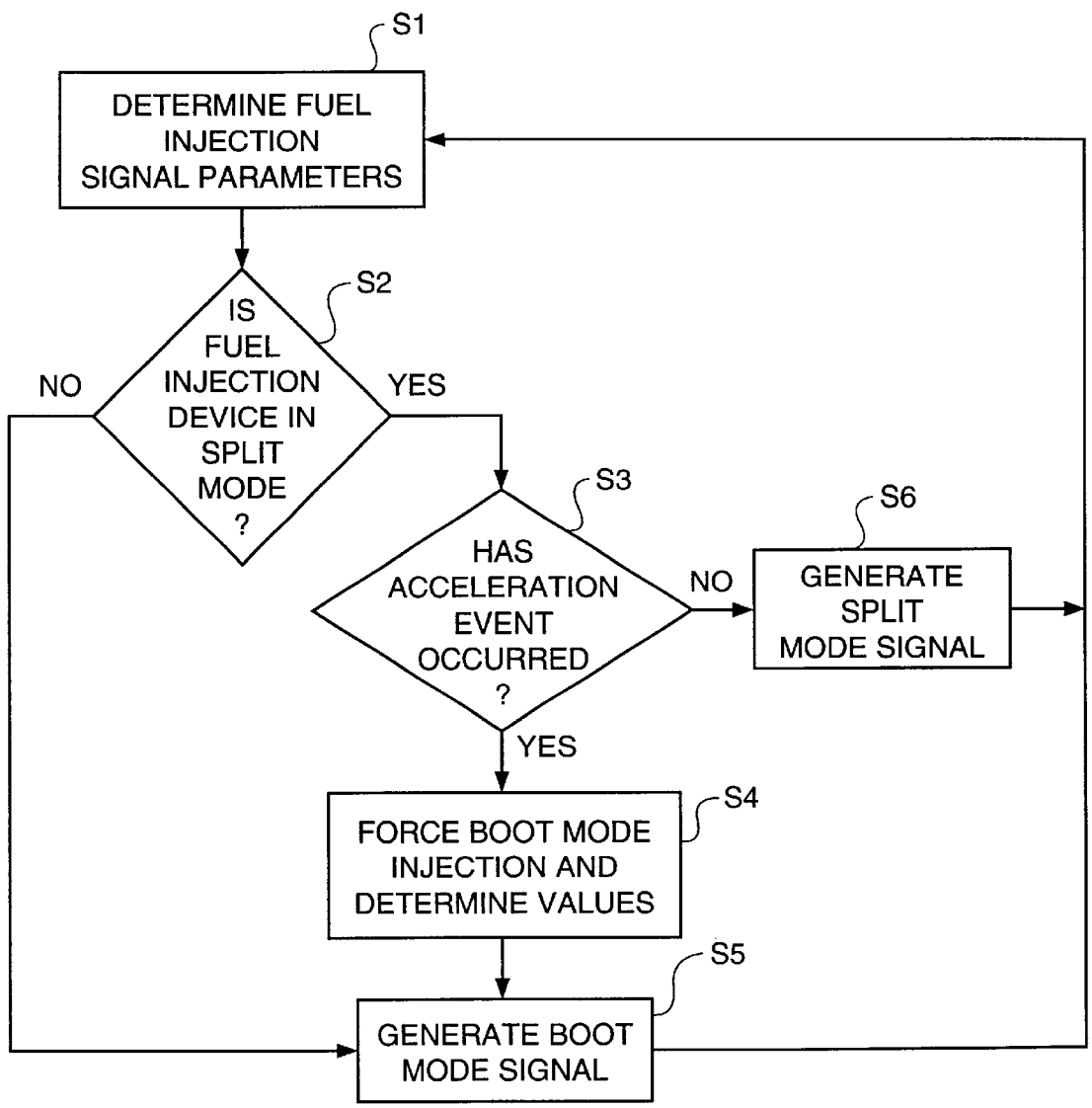

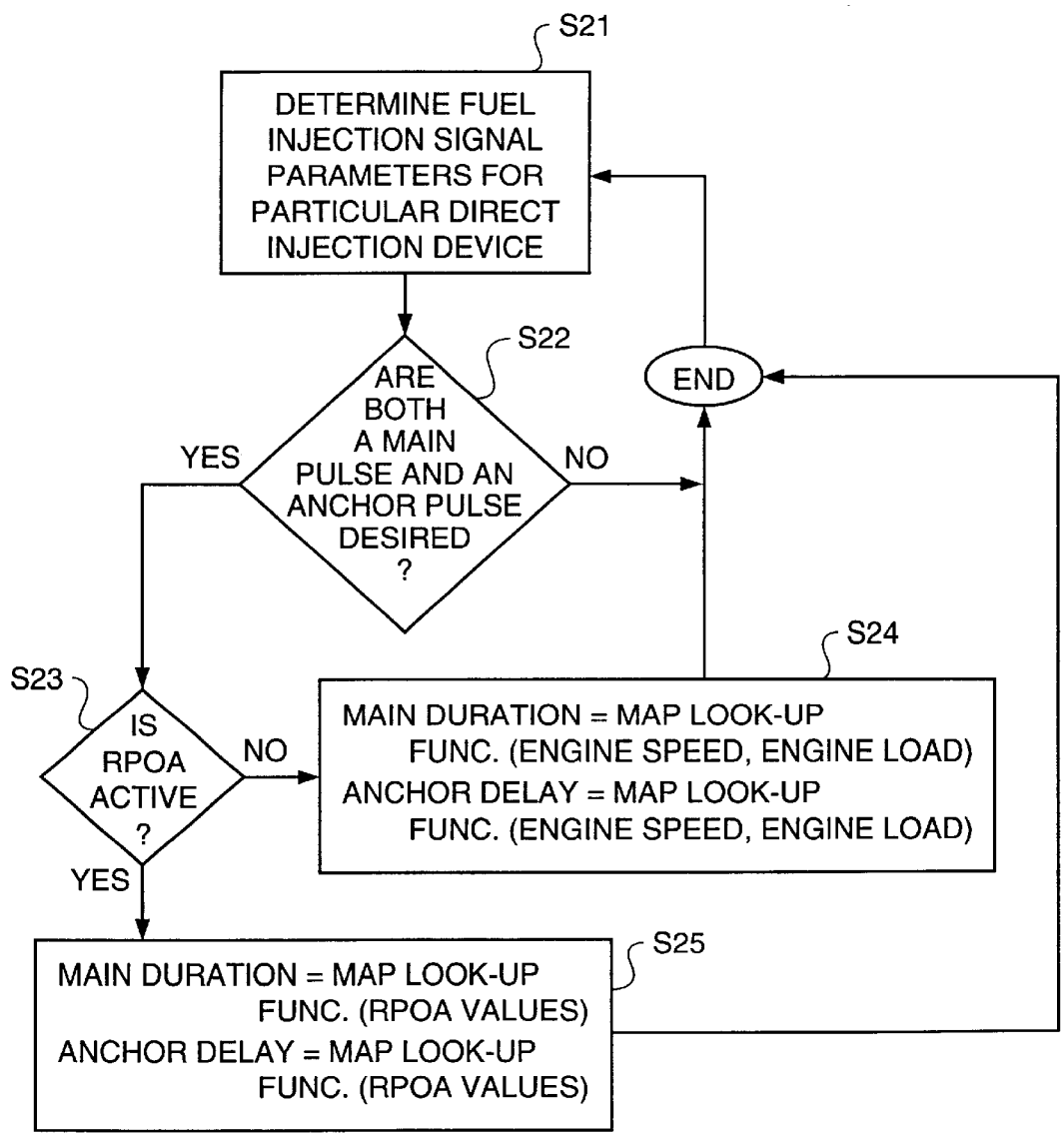
Fig_6C_

FUEL INJECTOR WITH MAIN SHOT AND VARIABLE ANCHOR DELAY

TECHNICAL FIELD

This invention relates generally to electronically controlled fuel injection systems and, more particularly, to a method and apparatus for accurately delivering multiple separate fuel injections to the cylinders of an internal combustion engine during a fuel injection event based upon engine operating conditions when the engine experiences an acceleration or when two fuel injection events are separated by a short period of time.

BACKGROUND

Electronically controlled direct fuel injection devices such as electronically controlled fuel injectors are well known in the art including both hydraulically actuated electronically controlled fuel injectors as well as mechanically actuated electronically controlled fuel injectors. Electronically controlled fuel injectors typically inject fuel into a specific engine cylinder in response to an electronic fuel injection signal received from an electronic fuel injection control device (controller) or system. These signals define waveforms that are indicative of a desired injection rate as well as the desired timing and quantity of fuel to be injected into the cylinders.

Emission regulations pertaining to engine exhaust emissions are becoming more restrictive throughout the world including, for example, restrictions on the emission of hydrocarbons, carbon monoxide, the release of particulates, and the release of nitrogen oxides (NOx). Tailoring the electronic fuel injection current signal waveform and the resulting number of injections and the injection rate of fuel to a combustion chamber during a combustion cycle of the cylinder, as well as the quantity and timing of such fuel injections, is one way to improve emissions and meet higher emissions standards. As a result, many different multiple fuel injection techniques, wherein the electronic fuel injection signal waveform comprises a plurality of distinct fuel injection signals, have been utilized to modify the burn characteristics of the combustion process in an attempt to reduce emission and noise levels. Some techniques involve the use of multiple fuel injections into a single cylinder during a single engine operating cycle, and typically involve splitting the total fuel delivery to the cylinder during a particular engine operating cycle into separate fuel injections. Such injections may include a pilot injection, a main injection, and an anchor injection, where three injections of fuel (a three shot injection) are desired to achieve a desired performance. Each of these fuel injections may also be referred to generally as a "shot". The "control current signal" (electronic fuel injection current signal), also may be referred to simply as a "fuel injection signal" to a fuel injector indicative of an injection or delivery of fuel to the engine.

At different engine operating conditions, it may be necessary to use different injection strategies in order to achieve both desired engine performance and emissions control. For example, any of a variety of multiple fuel injection techniques may be utilized at certain steady-state engine operating conditions, including low engine speed and low engine load, while other techniques may be utilized at different engine operating conditions requiring high speed or torque. In the past, the controllability of a multiple fuel injection or split injection event has been somewhat restricted by mechanical and other limitations associated with the particular types of injectors utilized. Even with more advanced electronically controlled injectors, during certain engine operating conditions, it is sometimes difficult to accurately control fuel delivery.

As used throughout this disclosure, an "injection event" is defined as the activity, including the injection of one or more shots, that occur in a particular cylinder or combustion chamber during one operating or combustion cycle of the engine (a "cylinder cycle"). For example, one cycle of a four stroke engine for a particular cylinder includes an intake stroke, compression stroke, expansion stroke, and exhaust stroke. Therefore, the injection event in a four stroke engine includes the number of injections, or shots, that occur in a cylinder during the four strokes of the piston. As used in the art, and throughout this disclosure, an "engine operating cycle" includes the individual cylinder cycles for the cylinders included therein. For example, an engine operating cycle for a six cylinder engine will include six individual cylinder cycles, one for each of the cylinders of the engine (with each cylinder cycle having four strokes, for a total of 24 strokes). Generally, the cylinder cycles overlap, so that the beginning of the next successive cylinder cycle of a particular cylinder might begin prior to the completion of the beginning of the next engine operating cycle.

U.S. Pat. No. 5,901,682 to McGee et al., which is commonly assigned to the Assignee hereof, describes a direct fuel injection compression ignition engine and a process for transitioning between different engine operating modes. The '682 patent describes calculating a weighted average transition fuel rate for smoothly transitioning between operating modes. The '682 patent does not, however, describe transitioning between a mode having a first characteristic injection shape, especially a split injection configuration or mode, and a mode having a second characteristic injection shape, especially a boot injection configuration or mode.

Desired engine performance is not always achieved at all engine speeds and engine load conditions using previously known fuel injection strategies where, based upon engine operating conditions, the injection timing, number and duration of shots, fuel flow rate and the injected fuel volume are determined in order to reduce emissions and improve fuel consumption. As a result, problems such as injecting fuel too rapidly within a given injection event and/or allowing fuel to be injected beyond a desired stopping point can adversely affect system stability, emission outputs and fuel economy.

In a fuel control system for an internal combustion engine in which one or multiple shots may be used in a given injection event and different injection signal waveforms are achievable, it is desirable to control and deliver any number of separate fuel injection shots to a particular cylinder so as to minimize emissions and fuel consumption based upon the operating conditions of the engine at that particular point in time, e.g. changes in speed, load, or ambient conditions. Such strategies may include splitting the fuel injection into two or more separate fuel shots during a particular injection event, advancing the pilot shot during the injection event, and adjusting the timing between the various multiple fuel injection shots in order to achieve desired emissions and desired fuel consumption. In some situations, it is also desirable to rate shape the front end of the fuel delivery to the cylinder to control the burn characteristics of the particular fuel being utilized. However, in some situations the particular shot duration or the fuel quantity for a given shot may be so small that it is not practical to inject the particular shot.

By way of example, during certain acceleration events, not all of the fuel delivered to the engine in the distinct fuel shots of a multi-shot fuel injection event is combusted for a variety of reasons. In one such event where a turbo charger is used, during an acceleration event the air mass delivered to the engine is lower because the turbo charger device associated with the engine has to spin up to deliver a greater quantity of air corresponding to the increase in the fuel. When a rich fuel mixture is introduced into the cylinder, more fuel is likely to contact the cylinder walls than with a comparatively leaner fuel mixture. Because a cylinder's walls are typically cooler in comparison to the interior of the cylinder, the fuel does not combust but instead mixes with the cylinder wall lubricating oil. This fuel deteriorates the lubricating quality of the engine oil and adversely impacts the fuel efficiency of the engine. Furthermore, such uncombusted fuel may be emitted in the form of hydrocarbons, which are a pollutant and therefore an undesirable component of an engine's emissions.

Further during an acceleration event, the time window used for fuel injection events may decrease. Thus, it becomes more difficult to inject multiple shots into a shrinking time window for a cylinder as engine speed increases. Rapidly changing engine speed can cause timing errors for all shots and in particular for shots that are placed at a particular piston position (crank angle). However, this is especially applicable to the anchor shot since it occurs a time delay after the main shot. As a result, the time interval between shots, or the time difference between the end of one fuel shot in a particular fuel injection event and the beginning of a subsequent fuel shot in the same fuel injection event, decreases. Therefore, it becomes increasingly important to deliver the individual fuel shots accurately as the timing between fuel shots becomes shorter.

Further, because the injectors in a given engine may have widely varying performance characteristics, and the quantity of fuel injected may vary despite commands of the same time duration, there is a need to provide stability to the operation of the injectors, particularly during periods where the mode of injector operation must transition from one mode to another mode.

Additional problems may be observed where the transition is from a one mode used for low speed operating conditions, and another mode, used for higher speed operating conditions. For example, "gas ingestion" by the fuel injector may occur when the pressure in the cylinder or combustion chamber is greater than the pressure in the fuel injector tip, e.g., during combustion of the main shot when an injector attempts to inject fuel into the cylinder. When an injector attempts to inject fuel under these conditions, hot gasses are blown into the injector from the cylinder, causing a void in fuel flow through the injector. Then, when the injector attempts to force fuel out of the injector nozzle (inject fuel), the injector tip will be forced into the injector tip check, damaging the injector. Transitioning between modes can cause gas ingestion.

Moreover, the changing engine speed under acceleration conditions corresponds to a change in the crank angle (timing) for injecting the particular fuel shot. Therefore, the desired angle previously determined for the injection of each fuel shot in each fuel injection event (prior to the acceleration conditions) might be slightly offset from the desired angle of injection after acceleration conditions. Such a situation is not desirable because offset fuel injection shots may detrimentally impact the engine's performance, efficiency, and emissions.

It is therefore desirable to provide an apparatus and method to control the delivery of fuel to an engine to control emissions during acceleration and deceleration. Accordingly, the present invention is directed to overcoming one or more of the problems as set forth above.

SUMMARY OF THE INVENTION

In one aspect of the present invention, an apparatus and method are disclosed for controlling a fuel injection system, which is adapted to operate in at least a split injection mode and a boot injection mode, and which comprises steps or means for determining whether an acceleration condition exists, and on the basis of such determination, rapidly changing from a split injection mode to a boot injection mode.

In another aspect of the present invention A fuel injection control system and/or a controller is operative to identify an acceleration condition on the basis of at least one sensed acceleration-related engine operating condition, and to rapidly change the fuel injection mode for at least one fuel injector from the split fuel injection mode to the boot fuel injection mode. The fuel injection control system and/or a controller is also operable to determine a rail pressure, whether the rail pressure is within a predetermined limit, and on that basis, to modify at least one of a main fuel injection signal timing and an anchor fuel injection signal timing such that a resulting multiple fuel injection has a boot injection shape.

Another aspect of the present invention describes a method and apparatus for controlling a fuel injection system to partition fuel output delivery to a plurality of direct fuel injection devices which transitions fuel delivery between the desired first injection characteristic shape and the desired second injection characteristic shape based on engine operating parameters.

BRIEF DESCRIPTION OF THE DRAWINGS

For a better understanding of the present invention, reference may be made to the accompanying drawings in which:

FIG. 2 is a schematic profile of a three shot fuel injection event;

FIG. 3 is a schematic illustration of an exemplary current waveform for three shot fuel injection event;

FIG. 4A is a schematic illustration of a representative current waveform for at least a main shot and anchor shot injection event in a split mode;

FIG. 4B is a schematic illustration of a split mode fuel injection profile for at least a main shot and anchor shot injection event of FIG. 4A;

FIG. 6A is a flow chart illustrating one process related to the present invention.

FIG. 6C is yet another flow chart illustrating a further process related to the present invention.

DETAILED DESCRIPTION

Figure 1:
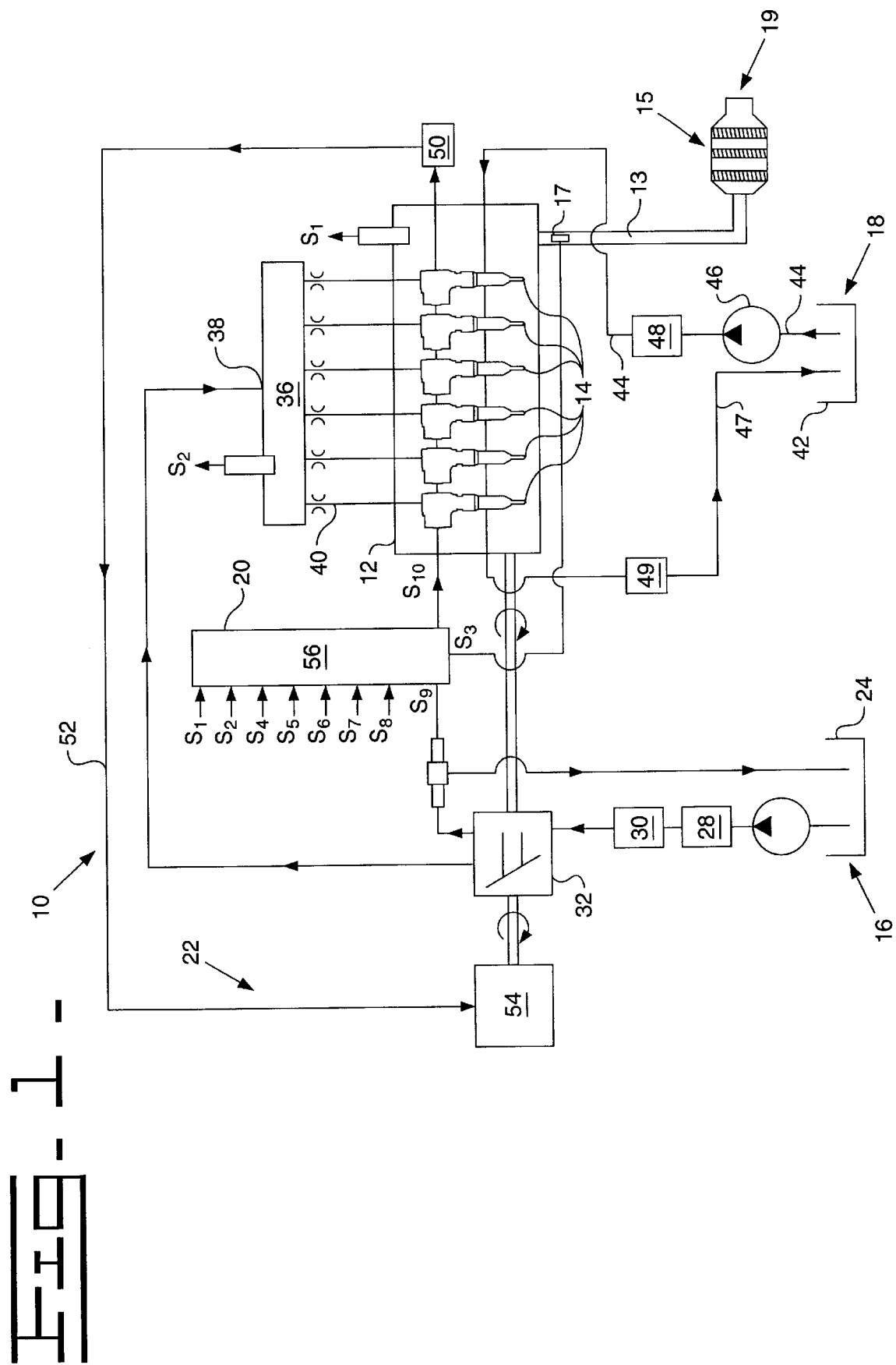
FIG. 1 is a schematic view of an electronically controlled fuel injector system according to one embodiment of the present invention.

Referring to FIG. 1, there is shown one exemplary embodiment of a hydraulically actuated electronically controlled fuel injection system 10 in an exemplary configuration as adapted for a direct-injection compression ignition engine 12. Fuel system 10 includes one or more electronically controlled fuel injection devices, such as a fuel injector 14, which are adapted to be positioned in a respective cylinder head bore of the engine 12. While the embodiment of FIG. 1 applies to an in-line six cylinder engine, it is recognized and anticipated, and it is to be understood, that the present invention is also equally applicable to other types of engines such as V-type engines and rotary engines, and that the engine may contain any number of cylinders or combustion chambers (not shown). In addition, while the embodiment of FIG. 1 also illustrates a hydraulically actuated electronically controlled fuel injector system, it is likewise recognized and anticipated that the present invention is equally applicable to other types of fuel injection devices, including electronically controlled injectors, mechanically actuated electronically controlled injector units, fluid activated common rail type fuel injection systems with digitally controlled fuel valves, and the like. The fuel system 10 of FIG. 1 includes an apparatus or comparable means 16 for supplying actuation fluid to each injector 14, an apparatus or comparable means 18 for supplying fuel to each injector, electronic control or means 20 for controlling the fuel injection system, including the manner and frequency in which fuel is injected by the injectors 14, for example, characteristics such as timing, number of injections per injection event, fuel quantity per injection, time delay between each injection, and the injection profile. The fuel injection system 10 may also include an apparatus 22 or other means for recirculating actuation fluid and/or recovering hydraulic energy from the actuation fluid leaving each injector 14.

The actuating fluid supply apparatus or comparable means 16 preferably includes an actuating fluid sump or reservoir 24, a relatively low pressure actuating fluid transfer pump 26, an actuating fluid cooler 28, one or more actuation fluid filters 30, an actuation fluid high pressure pump 32 for generating relatively high pressure in the actuation fluid, and at least one relatively high pressure actuation fluid manifold or rail 36. A common rail passage 38 is arranged in fluid communication with the outlet from the relatively high pressure actuation fluid pump 32. A rail branch passage 40 connects the actuation fluid inlet of each injector 14 to the high pressure common rail passage 38. In the case of a mechanically actuated electronically controlled injector, manifold 36, common rail passage 38 and branch passages 40 would typically be replaced with some type of cam actuating arrangement or other mechanical means for actuating such injectors. Examples of a mechanically actuated electronically controlled fuel injector unit are disclosed in U.S. Pat. Nos. 5,947,380 and 5,407,131.

Apparatus 22 may include a waste accumulating fluid control valve 50 for each injector (only shown by way of example), a common recirculation line 52, and a hydraulic motor 54 connected between the actuating fluid pump 32 and recirculation line 52. Actuation fluid leaving an actuation fluid drain of each injector 14 would enter the recirculation line 52 that carries such fluid to the hydraulic energy recirculating or recovering apparatus 22. A portion of the recirculated actuation fluid is channeled to high pressure actuation fluid pump 32 and another portion is returned to actuation fluid sump 24 via recirculation line 34.

In a preferred embodiment, the actuation fluid is engine lubricating oil and the actuating fluid sump 24 is an engine lubrication oil sump. This allows the fuel injection system to be connected as a parasitic subsystem to the engine's lubricating oil circulation system. Alternatively, the actuating fluid could be fuel or some other type of suitable liquid.

The fuel supply apparatus 18 or comparable means preferably includes a fuel tank 42, a fuel supply passage 44 arranged in fluid communication between the fuel tank 42 and the fuel inlet of each injector 14, a relatively low pressure fuel transfer pump 46, one or more fuel filters 48, a fuel supply regulating valve 49, and a fuel circulation and return passage 47 arranged in fluid communication between each injector 14 and fuel tank 42.

Electronic control means 20 preferably includes an electronic control module (ECM) 56, also referred to as a controller, the use of which is well known in the art. Although not illustrated in FIG. 1, the ECM 56 typically includes processing means such as a microcontroller or microprocessor, a governor such as a proportional integral derivative (PID) controller for regulating engine speed, and circuitry including input/output circuitry, power supply circuitry, signal conditioning circuitry, solenoid driver circuitry, analog circuits and/or programmed logic arrays, as well as associated memory. The memory, which may be a RAM, a ROM, or other type of data storage known in the art, is connected to the microcontroller or microprocessor and stores instruction sets, maps, lookup tables, variables, and the like. The maps and/or tables stored in memory are particularly useful in the efficient control of fuel injection events because the desired control information may be quickly accessed or generated by the ECM in order to control the timing, duration and fuel amount for each injection event.

Whether its operation is based on tables or calculations, the ECM 56 may be used to control many aspects of fuel injection, including (1) the fuel injection timing, (2) the total fuel injection quantity during an injection event, (3) the fuel injection pressure, (4) the number of separate injections or fuel shots during each injection event, (5) the time intervals between the separate injections or fuel shots, (6) the time duration of each injection or fuel shot, (7) the fuel quantity associated with each injection or fuel shot, (8) the actuation fluid pressure, (9) electrical current level of the injector waveform, and (10) any combination of the above parameters. Hence, the ECM 56 or a portion thereof will also be referred to as an "electronic fuel injection control device" or "electronic fuel injection control system."

ECM 56 receives a plurality of sensor input signals $S_1$–$S_8$ which correspond to known sensor inputs, particularly those related to engine operating conditions including but not limited to engine temperature $S_1$, rail pressure $S_2$, exhaust gas temperature $S_3$, engine speed $S_4$, cylinder piston position $S_5$, pressure of the actuation fluid $S_6$, throttle actuation or depression $S_7$ and so forth, that are used to determine the desired combination of injection parameters for a subsequent injection event. ECM 56 may also determine a desired combination of injection parameters for a subsequent injection event based on engine load. Engine load is the amount of work being performed by the engine at a particular point in time and is generally defined in terms of rated engine load or work capacity. Engine load can be measured by a wide variety of different methods known in the art such as by using the total quantity of fuel delivered to the engine for a particular task or work operation as an indicator of engine load.

For example, an engine temperature sensor 58 is illustrated in FIG. 1 connected to engine 12. In one embodiment, the engine temperature sensor includes an engine oil temperature sensor. However, an engine coolant temperature sensor can also be used to detect the engine temperature. The engine temperature sensor produces a signal, designated by $S_1$ in FIG. 1, that is inputted to ECM 56. In the particular example illustrated in FIG. 1, ECM 56 issues control signal $S_9$ to control the actuation fluid pressure from pump 32 and a fuel injection signal $S_{10}$ to energize a solenoid or other electrical actuating device within each fuel injector 14, thereby controlling fuel control valves within each injector 14 and causing fuel to be injected into each corresponding engine cylinder. Each of the injection parameters are variably controllable, independent of engine speed and load. In the case of the fuel injectors 14, control signal $S_{10}$ is a fuel injection signal that is an ECM commanded current to the injector solenoid or other electrical actuator.

It is recognized that the type of fuel injection desired during a particular fuel injection event will typically vary depending upon various engine operating conditions at the time. In an effort to improve emissions, it has been found that delivering multiple shots to a particular cylinder during a single fuel injection event or cylinder cycle at certain engine operating conditions achieves both desired engine operation as well as emissions control. FIG. 2 schematically illustrates an injection event with multiple shots, including in sequence a pilot shot 60, a main shot 62, and an anchor shot 64. The pilot shot 60 is injected into the combustion chamber in advance of the main shot 62 by some predetermined time factor, crank angle or the like that determines a pilot advance 61A and results in a time between the end of the pilot 60 and the beginning of the main shot 62 that defines a main delay 61. The anchor shot 64 is sequenced after the main shot 62 based upon a predetermined time factor, crank angle or the like that results in an anchor delay 63.

The sequence, timing and duration of the shots in an injection event are determined by the ECM 56, based upon programming stored in memory and a plurality of specialized maps and/or lookup tables stored within the memory of ECM 56. Such maps and/or tables are operative to correlate characteristics of the pilot shot, the main shot, the anchor shot, and the anchor shot delay, for example, to specified engine operation parameters, such as engine speed, engine load, the pressure associated with rail passage 38 (rail pressure), desired total fuel quantity and other parameters, on the basis of data returned from the maps or tables. Specifically, using such maps or tables, ECM 56 also can dynamically determine the appropriate number of fuel shots to be used for a given injection event (e.g., pilot 60, main 62 and/or anchor 64), the quantity of fuel required for each fuel shot, the timing and duration of each individual shot as well as the anchor delay 63. That is, programming associated with electronic controller 56 includes parameters that are determined by computations and/or logical comparisons during program execution, with reference, for example, to the maps and/or lookup tables. Thus, any of the above-mentioned parameters with respect to the arrangement of shots illustrated in FIG. 2, or combination thereof, may be selectively and/or dynamically adapted or altered over time, both with respect to individual cylinder cycles and over a single or multiple engine operating cycles.

While there are three shots illustrated in the injection event depicted in FIG. 2, where a portion of the total fuel to be delivered to the combustion chamber will be injected by the pilot shot 60, a portion of such total fuel will be injected by the main shot 62, and the remaining and dominant portion of the total fuel will be injected by the anchor shot 64, the timing and duration of the shots may be varied depending on operating conditions. Under certain engine operating conditions, a multiple fuel injection event utilizing three fuel shots has advantages in terms of exhaust emissions, including reduced particulate emissions and/or reduced NOx emissions, and in terms of achieving desired engine performance. However, under certain circumstances, it may be desired to reduce the injection event to a single shot, by eliminating the pilot shot and combining the main and anchor shots, or to modify the event to have two or more shots by combining the main and anchor shots. It may also be desirable under certain circumstances to increase the injection event to include four or more shots by adding a post injection shot, depending on the current engine operating conditions.

An exemplary current waveform or fuel injection signal for a three shot injection event is illustrated in FIG. 3 showing a pilot shot control signal or simply pilot signal 66, a main shot control signal or simply main signal 68, an anchor shot control signal or simply anchor signal 70, a main delay signal 72 between the pilot and main shot control signals (66, 68), and an anchor signal delay 74 between the main and anchor shot control signals (68, 70). The duration of each of the control signals 66, 68 and 70 can be varied by ECM 56, and the duration of delays 72 and 74 can likewise be controlled by ECM 56. In one exemplary embodiment of the invention, the timing and duration of the main shot 62 (as shown in FIG. 2) is determined and set by ECM 56 and the timing and duration of the pilot shot 60 and anchor shot 64 are thereafter determined based upon the main shot timing. Thus, as set out above, the main shot 62 may be referred to as a first shot, a pilot shot 60 may be referred to as a second shot, and the anchor shot 64 may be referred to as a third shot. Corresponding fuel injection signals for the main, pilot and anchor shots may likewise be referred to as first, second and third fuel injection signals, respectively. In this regard, the start of the second or pilot shot 60 will typically be determined based upon known parameters such as the first or main shot timing and pilot advance and the third or anchor shot timing will be just a time delay based upon termination of the main shot 62. Other methods for determining the various parameters associated with the three fuel injection shots are likewise recognized and anticipated.

FIG. 3 also illustrates a pull-in current level 78 and a hold-in current level 79 associated with a typical hydraulically actuated electronically controlled fuel injector or other fuel injection device. When using hydraulically actuated electronically controlled fuel injectors, the fuel injection signal or waveform includes generally a two-tier form that includes the pull-in current level 78 and the generally lower hold-in current level 79. The higher pull-in current is used to quickly open the fuel injector and thereby decrease the response time, that is, the time between the initiation of a fuel injection signal and the time in which fuel actually begins to enter the engine cylinder. Once fuel injection has commenced, a lower level hold-in current can be used to hold the injector 14 open for the remainder of the injection event. The pilot, main and anchor pull-in durations are likewise illustrated in the representative current waveform depicted in FIG. 3. Based upon engine operating conditions, the type of fuel and fuel injection devices being utilized, and other parameters, it is recognized and anticipated that the waveform illustrated in FIG. 3 may be modified and altered accordingly.

During normal engine operating conditions, after analysis of several engine related conditions, a desired electronic fuel injection current signal waveform, as shown in FIG. 3, is determined and generated which will generally produce, as shown in FIG. 2, a main injection or shot 62, an anchor injection or shot 64, and possibly a pilot injection or shot 60. Maps or look-up tables are used to assist in these determinations which indicate the timing and fuel quantity for each injection. Upon completion of these determinations various parameters and engine operating conditions are evaluated to determine if the waveform falls within a desired stable set of conditions, or if engine operating conditions are such that the waveform may be unstable. For example, the initial fuel injection signal may include a distinctly separated main injection 68 and an anchor injection 70. The fuel injection signal representing this initial strategy may include these injections with associated injection duration and injection delays, as shown in FIG. 3 above. However, during certain periods of engine operation (e.g., engine acceleration), the durations of the main and anchor shots, and the delay therebetween might be such that the fuel injection devices 14 are unable to produce the desired injection. Therefore, after the timing, duration and delay are determined for each of the fuel injections or shots, what was originally anticipated as requiring distinctly separated main and anchor fuel injections, may now be required to have the main and anchor injections close together.

In one embodiment of the present invention, the fuel injection control system 10 and particularly the ECM 56, dynamically predicts or determines engine condition changes and correspondingly transitions fuel delivery between a first injection characteristic shape (where the main and anchor shots are distinctly separated) and a second injection characteristic shape (where the main and anchor shots are close together) in order to avoid unstable or otherwise undesirable results. The split injection results in superior emissions and fuel economy during low engine speed (idle), while the boot injection is preferred at higher engine speeds. Accordingly, the ECM 56 will be programmed to transition fuel delivery between the desired injection shape characteristics based on engine operating parameters.

FIGS. 4A and 4B provide an illustration of fuel injection-related signals for electrical current and fuel, respectively. Referring to FIG. 4A, when electrical fuel injection signals are sent to an injector 14, the injector 14 responds by opening and closing as directed. A representative fuel injection current signal 100, illustrates an electrical current command for injecting a main shot 102 and an anchor shot 104. This representative fuel injection current signal or waveform 100 reflects a "split mode" injection command, wherein the main shot 102 has a duration indicated by region A and is followed by an anchor shot 104 having a duration indicated by region B. The end of the main shot 102 is separated from the beginning of the anchor shot 104 by an anchor delay having a duration indicated by the region C.

A resulting representative fuel injection profile 106, corresponding to the electrical fuel injection signal 100, is illustrated in FIG. 4B. The fuel injection signal will have two distinct peaks, representing the separate and spaced injection of fuel into the chamber. This split mode of operation is particularly attractive in idle or low speed operation of the engine, because of the high fuel efficiencies and low emission characteristics that it can achieve.

Figure 5A:
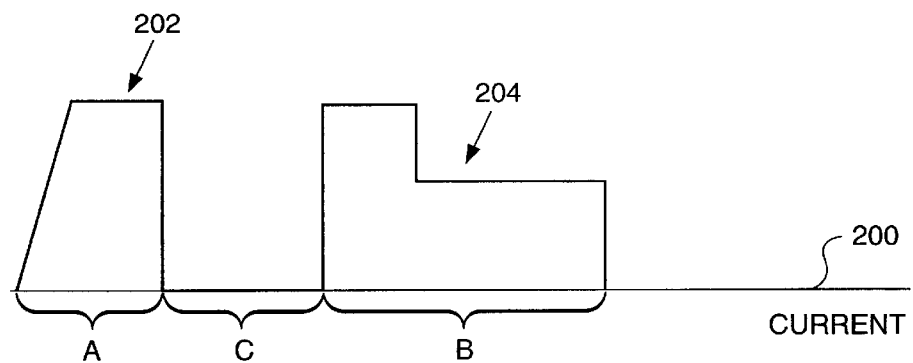
FIG. 5A is a schematic illustration of a representative current waveform for at least a main shot and anchor shot injection event in a boot mode.
Figure 5B:
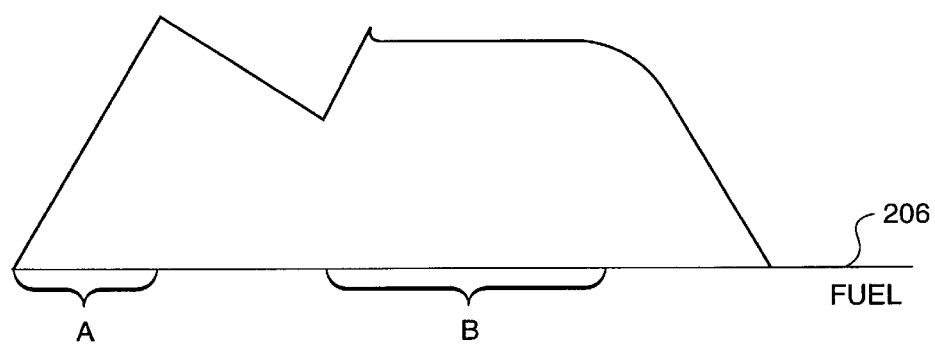
FIG. 5B is a schematic illustration of a boot mode fuel injection profile for at least a main shot and anchor shot injection event of FIG. 5A.

Because the injector 14 does not react instantaneously to the fuel injection signals, the injector valve stays open briefly after a current pulse is terminated, and if the anchor delay C is sufficiently short, such as at higher engine speeds or during an acceleration event, the start of the next fuel injection current signal or pulse is received before the injector valve is fully closed. Thus, when the anchor delay duration C is sufficiently short, and when the main duration is of sufficiently short duration, as illustrated by the representative fuel injection current signal 200 in FIG. 5A, a condition known as a "boot injection mode" or "boot mode configuration" is produced. Under these conditions, the main shot 202 is sufficiently close to the anchor shot 204 and of a sufficiently short duration that it serves solely to "rate shape" the anchor fuel shot. The representative fuel injection profile 206 will then have a "boot" shape as depicted in FIG. 5B without the distinct "split" between the main and anchor shots. While the current signal pulses in FIG. 5A appear to show two separate pulses separated by a duration defined by region C, the actual fuel injection is substantially continuous throughout the two shots representing the boot mode configuration as shown in the fuel injection profile 106 illustrated in FIG. 5B. The "boot mode" of operation is preferred for higher speed operations, because of the highly efficient way in which fuel is delivered to the injectors. A "boot mode" operation delivers a higher quantity of fuel earlier in the injection sequence, as compared to a "split" mode since, in a boot mode, the fuel injection flow rate does not go to zero between the respective shots.

In one embodiment of the present invention, empirical data for a given engine configuration and conditions are stored in a memory location within the fuel injection control device or system which may preferably be included in the ECM 56. This data may be stored as a map or look-up table for interpolation by the ECM 56. From such data, a pilot injection fuel quantity and timing, a main injection fuel quantity and timing and an anchor injection fuel quantity and timing, for example, can be determined for a given system at a plurality of engine operating conditions and loads. Thus, the ECM 56 can periodically adjust the pilot, main and anchor shot fuel quantity and timing to correspond to a determined injection fuel amount and timing based upon engine operating conditions. The stored data described above may be converted into injector pull-in and hold-in time increments corresponding to each fuel injector for each cylinder cycle by, for example, programming or algorithms of the ECM 56, which may in turn be implemented using software and/or hardware units. The fuel injector open time is determined from the data, for example, a table stored in the ECM's memory. The ECM 56 then commands the corresponding fuel injector 14 to open at the correct timing, and commands the fuel injector to close when the determined quantity of fuel has been injected to the cylinder. These commands are accomplished using the current waveforms described in detail below. In some applications it may also be desirable to convert the stored data into curve fit equations that are utilized by the ECM 56 as an alternative to a "look-up" table, as previously described. In such a case, the injector draw-in and hold-in time would be calculated via the curve and fit function utilizing the engine operating conditions sensed by the ECM.

Still further, it should be noted that in one exemplary embodiment of the present invention disclosed herein, each separate fuel shot associated with a multiple fuel injection event is delivered or injected into the combustion chamber when the cylinder piston is located or displaced within a predetermined range during the compression and power strokes, as set out. However, it is recognized that each such separate fuel shot can be delivered outside of these ranges due to factors such as the fuel quantity associated with each fuel shot, the injection pressure, engine speed, engine load and other parameters. In this regard, it is recognized that the pilot shot can be injected at any time during the compression stroke, as set out above; the main shot can be injected at any time during the compression or power stroke after delivery of the pilot shot; and the anchor shot can be injected at any time during the compression or power stroke after delivery of the main shot. In addition, although the present multiple fuel injection events have been discussed in terms of an exemplary electronic fuel injection current waveform, such as the exemplary waveforms illustrated in FIGS. 4A and 5A wherein a separate electronic fuel injection current signal or pulse controls each fuel shot, it is also recognized that other types of control signals, for example hydraulic pressure, could be used in connection with other types of direct fuel injection device (fuel injectors) and fuel injection schemes. For example, some fuel injectors use hydraulic pressure to control injection timing and in those systems, a separate pressurization of the actuating fluid may take place for the injection of each fuel shot.

The split fuel injection profile illustrated in FIG. 4B depicts a fuel injection that results in a specific desired quantity of fuel being injected into a particular cylinder at a specific desired time, for a specific desired duration, and in a specific desired manner. A second example of such a resulting fuel injection profile is the "boot" shaped injection depicted in FIG. 5B. As set out above, the boot mode configuration of fuel delivery generates a different quantity of fuel delivered to the cylinder as compared to a distinct split configuration fuel delivery since in a boot mode type delivery, the fuel injection flow rate never goes to zero between the respective fuel shots (main and anchor shots). Conversely, in a split fuel delivery or split injection mode, such as in FIG. 4B, the fuel injection flow rate may go to zero between the respective fuel shots. As a result, more fuel is generally delivered in a boot mode type delivery as compared to a split fuel delivery between the main and anchor fuel shots. Depending upon the operating conditions of the engine, desired engine performance and desired emissions output, and other factors and/or parameters, it may be desirable and advantageous, in certain situations, to deliver the main and anchor fuel shots in a split mode and, in other situations, it may be desirable and advantageous to deliver the main and anchor fuel shots in a boot mode condition. The present control system is cable of dynamically determining the appropriate parameters associated with a particular multiple fuel injection event to yield either a split mode or a boot mode type fuel delivery based upon the particular engine operating conditions.

It is also anticipated, in one exemplary embodiment, that the pull-in duration for each shot, the shot duration, the anchor delay and the pilot and main shot timing with respect to the displacement of the cylinder piston will be determined, calculated, or looked up in respective maps and/or tables as a function of any one or more of the following parameters, namely, engine speed, engine load, rail pressure, total desired fuel quantity, oil or coolant temperature, exhaust temperature, atmospheric pressure and still other parameters. It is also recognized that other fuel systems will use different current waveforms. As used in the art, and as used throughout this disclosure, "timing," and in particular anchor shot timing or anchor fuel injection signal timing may be used to refer to the relative position of an individual shot or current signal as a function of the piston position, and its absolute position in relation to some time reference, as well as the delay with respect to a preceding shot or fuel injection signal, i.e. the anchor fuel injection signal delay.

During engine acceleration, the speed of the engine increases in accordance with the requested rate of acceleration and an additional amount of fuel is delivered to the engine to facilitate the acceleration. The amount of fuel delivered to the engine during such acceleration events is typically determined from or limited by a fuel, torque or other map or table available to electronic control means 20, which has maps and look-up tables that may be implemented in any of the various ways known in the art. This additional amount of fuel delivered to the engine during an acceleration event generally requires a corresponding amount of additional air in order to maintain desired emission and performance standards, which is usually generated and supplied by a turbo charger device associated with the engine. This turbo charged air is mixed with the fuel to facilitate complete combustion of all fuel delivered to the respective cylinders in engine 12. During certain acceleration conditions, however, the turbo charger device may not achieve the desired response in order to increase the amount of air in proportion to the additional amount of fuel being delivered to the engine. As a result, the air-to-fuel ratio may decrease significantly during certain acceleration events with the air/fuel mixture being too rich with fuel. The same problem may also occur in engines without turbo chargers. The inadequate amount of air is usually due to the delay in the response time of the turbo charger device, which usually requires time to spin up to perform at the desired capacity during an acceleration event. The high fuel-to-air ratio allows more fuel to contact the cylinder walls than with a comparatively leaner fuel mixture. This uncombusted fuel may deteriorate the lubrication properties of the oil, and it may also be emitted from the engine as hydrocarbons, as set out above. Those skilled in the art will appreciate that the occurrence of either of these events is undesirable.

Further depending upon the responsiveness of the fuel control strategy, during an acceleration event, the time duration of each fuel injection event may decrease as the speed of the engine increases. In addition, the time duration or interval between the end of one fuel shot and the commencement of a subsequent fuel shot may decrease, whereby accurate timing of each distinct fuel shot becomes all the more important. In an acceleration event, however, the start of each distinct fuel shot may not occur at the desired time. The reason therefor is that the start relative angle of each fuel shot is usually converted to an absolute crank angle value corresponding to the angular position of a crankshaft associated with the engine during the respective fuel injection event. However, since the speed of the engine is rapidly changing, the actual placement of the fuel shot may be less accurate by the time the crankshaft reaches the calculated angular position. Therefore, it is difficult to get a desired amount of fuel at the desired timing or duration. For example, if acceleration is accounted for in injection timing, it may be difficult to get all of the desired fuel where it is desired. This offset fuel shot timing may result in erratic performance of the engine and poor emissions during the acceleration event. Further, due to air-to-fuel ratio issues, the fuel that is delivered to the cylinder can lead to undesirable emissions. Therefore, the present invention envisions that during periods of acceleration, the injection shape will be "forced" into a boot mode configuration so as to avoid an unstable/undesirable condition. This embodiment may be advantageously implemented such that the fuel injection control system and particularly the ECM 56 maintain control of fuel delivery even during rapid changes in engine operating conditions. This strategy also has an additional benefit of allowing the ECM 56 to predict engine speed increases and proactively increase fuel rail pressure accordingly, so that desired fuel injection quantities and timing may be achieved. Still another benefit of this strategy is a reduction in the number and complexity of the look-up tables and/or maps that are required for the implementation thereof. This beneficially reduces the amount of operations and memory required by the ECM 56. In order to overcome the above-described problems during certain engine operating conditions, exemplary processes as illustrated in FIGS. 6A–6C may be followed.

In particular, where an engine can be operated in both a split mode for low speed or idle conditions and a boot mode for higher speed conditions, it may be advantageous to effectively control the transition from a split mode to a boot mode of operation on the basis of engine operating conditions, particularly an acceleration event. In one embodiment of the present invention, as illustrated in FIG. 6A, in a first step S1, the fuel injection signal parameters are determined. In a second step S2, it is determined whether the fuel injection system is operating in a split mode. If in a split mode, in a third step S3, it is determined whether an acceleration event has occurred, such as by sensing an increase in the fuel rail pressure, a throttle actuation, engine load, or the like. If no acceleration event has occurred, a split mode signal would be generated in step S6 and the process returns to step S1. In a fourth step S4, if an acceleration event has occurred, the jump may be accomplished by forcing the ECM 56 to reference a map or table having boot mode values, or by forcing the ECM 56 to immediately calculate values for a boot mode of operation, without allowing a transition on the basis of additional sequences of calculation. Following step S4, in a step S5, a boot mode fuel injection signal is generated and applied to the fuel injection devices, followed by a return to step S1. The signal causes a jump from the split mode of operation to a boot mode. This jump from split mode to boot mode occurs rapidly (without substantial delay), so that the transition occurs within one engine operating cycle and preferably within one cylinder cycle of the particular cylinder in question, so that ECM 56 does not transition through an unstable condition. Such a strategy during acceleration may also advantageously reduce the occurrence of fuel penetration to the cylinder walls, which reduces fuel dilution of the lubrication oil and the amount of hydrocarbon byproducts in the engine's exhaust emissions. A decrease in the amount of uncombusted fuel in the cylinder helps improve the fuel efficiency and emissions of the engine. Further, rapid achievement of the boot injection configuration helps reduce the problems associated with time to angle conversion errors in the commencement of the main/anchor shot sequence as discussed above.

In another embodiment of the present invention, the ECM 56 may rapidly determine the appropriate anchor fuel injection signal delay for each of the injection devices 14 during each engine operation cycle. The data for the anchor fuel injection signal delay may be stored as a map or look-up table for selective interpolation by the ECM 56. If the ECM 56 operates according to a process illustrated in FIG. 6B, in a first step S11, the fuel injection signal parameters are determined. In a second step S12, it is also determined whether the fuel system is operating in a split mode. If in a split mode, in step S13 it is determined whether the anchor fuel injection signal delay (74 in FIG. 3) is between predetermined limits. If within predetermined limits, a split mode signal is generated in step S16 and the process returns to step S11. However, if the anchor fuel injection signal delay is less than a predetermined limit for a multiple shot injection having a split injection shape, but greater than a predetermined limit for a multiple shot injection having a boot injection shape it indicates the existence of an unstable condition, where the operating conditions cannot be reliably monitored and controlled. Accordingly, in step S14, the corresponding main fuel injection signal timing and/or the corresponding anchor fuel injection signal timing are modified immediately such that the resulting multiple fuel injection has a boot injection shape. In step S15, a boot mode fuel injection signal is generated and applied to the fuel injection devices. The duration of each of the main fuel injection signal and the corresponding anchor fuel injection signal may also modified, as well as the anchor fuel injection signal delay duration. This helps to ensure that the ECM 56 will select the proper main and anchor shot delivery maps and/or look-up tables, and will not interpolate from improperly selected maps and/or tables, through an unstable fuel injection map region. Of course, by forcing a jump from one set of tables to another across a range of operating conditions, this also reduces the number and complexity of such maps while improving engine operation stability and reducing engine exhaust emissions. Thus, the likelihood of occurrence of the problems discussed above is considerably reduced during the acceleration event. Upon generation of the boot mode signal instep S15, the process returns to step S11.

Figure 6B:
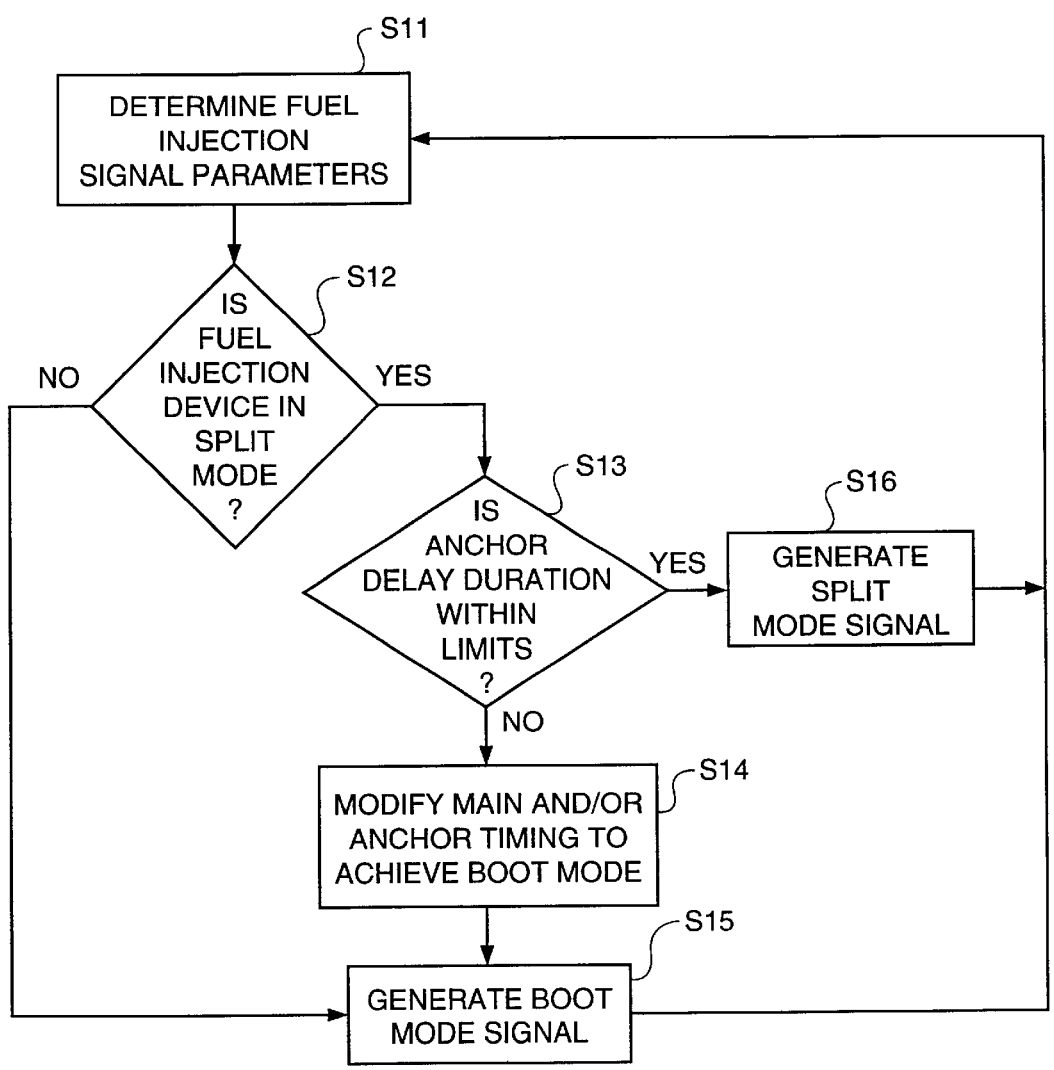
FIG. 6B is a flow chart illustrating another process related to the present invention.

While the ECM 56 may be designed to "force" an immediate transition from a split mode to a boot mode, the ECM in the processes of both FIGS. 6A and 6B can then return to a normal control operation. Thus, as the engine catches up and is no longer accelerating, the fuel injection signals may be stabilized in a boot mode operation or even returned to a split injection mode configuration. It is recognized and anticipated that the particular strategy implemented therefor will typically vary from one embodiment to another.

In yet another embodiment, the use of a rail pressure on acceleration (RPOA) control, is contemplated, as illustrated in FIG. 6C, for fuel system control. The RPOA is a process used for controlling operation of the system with a predetermined set of rail pressure values that exist under an acceleration condition. In the process of FIG. 6C, the ECM 56 may again determine the appropriate anchor fuel injection signal delay for each of the injection devices 14 during each engine operation cycle by first determining the fuel injection signal parameters for the particular fuel injection device 14 in step S21. In step S22, it is then determined whether both a main fuel injection signal (pulse) and an anchor fuel injection signal (pulse) are desired. This may be accomplished, for example, by determining whether the anchor shot duration is a non-zero value and the main fuel quantity has a zero value. If both a main and an anchor pulse are not required, the subroutine proceeds to an end, and the process of controlling fuel injection continues. If in a boot mode, according to a third step S23, a determination is made as to whether RPOA is active, that is whether the ECM 56 is operating according to a predetermined process for assigning to the main shot, anchor delay and anchor shot certain specific values appropriate for the engine to be operating in an acceleration condition. If not, the process moves to a fourth step S24 in which the main duration and the anchor delay are both determined from a map or table on the basis of engine operating parameters, such as, for example, engine load and engine speed. Upon completion of that process, the operation of the engine at the new values will continue. However, if the RPOA is active, in step S25, the main duration and anchor delay will be determined on the basis of predetermined RPOA values. The RPOA value may be obtained from map or table look-ups, or each may be a single configurable value. Following one of the alternative steps S24 and S25, engine operation proceeds with the new values.

In order to practice the present invention, electronic control means 20 or ECM 56 must be operable to detect, determine or otherwise recognize certain engine acceleration conditions or other engine operating conditions which may require the above-described transition strategy. The ECM 56 may then control the electronic fuel injection current signal to achieve the desired electronic fuel injection current signal waveform, including the number of shots therein, necessary to maintain emissions within proper limits. This may be accomplished in a variety of ways, and any one or a combination thereof may be utilized. In one exemplary embodiment, as shown in FIG. 1, a signal generating means such as an engine speed sensor is coupled to ECM 56 and is operable to output a signal thereto indicative of the speed of the engine. Based upon this signal, ECM 56 is operable to determine the rate of change of the engine speed over time. If the rate of change of the engine speed exceeds a predetermined threshold value indicating an acceleration event, the ECM 56 will control the fuel injection signals accordingly, thereby producing a boot injection mode.

It is recognized and anticipated that any one or a plurality of other signal providing mechanisms may likewise be coupled to ECM 56 for providing a signal thereto indicative of a condition which can be correlated to engine operating conditions, including an acceleration or deceleration event, wherein a desired emissions limit might be exceeded. Such mechanisms may be any of the various mechanisms known in the art such as a rail pressure sensor, an air intake boost pressure sensor and still other sensors.

Industrial Applicability

As described herein, the present apparatus and method has particular utility in all types of engines, such as engines utilized in vehicles, work machines, marine vessels, electrical generators, stationary engines, and the like. The present apparatus and method, therefore, provides a control system and method for controlling the electronic fuel injection current waveform and corresponding the number of fuel shots in any multi-shot fuel injection event based upon certain engine operating condition such as acceleration or deceleration conditions, which yield undesirable exhaust emissions.

It is recognized and anticipated that the engine threshold values, the time periods of engine performance monitoring by electronic control means 20, and the like, may be pre-programmed into the electronic control means 20, or such values may be available in maps or tables stored in a memory means or data storage means associated with electronic control means 20. Alternatively, such values may be determined by appropriate formulas or mathematical computations to be performed by ECM 56 in a continuing loop or at fixed time intervals. In this regard, appropriate fuel maps relating rail pressure, engine speed, engine load, pilot/main/anchor duration times, pilot/main/anchor fuel quantities, anchor timing delays, pilot/main timing, and other parameters can be stored or otherwise programmed into ECM 56 for use during all operating conditions of the engine. These operational maps, tables and/or mathematical equations stored in the ECM programmable memory determine and control the various parameters associated with the appropriate multiple injection events to achieve desired engine performance. Accordingly, it is recognized and anticipated that electronic control means 20 may perform such steps in any one of the various ways known in the art.

It is also recognized and anticipated that electronic control means 20 may determine or recognize certain acceleration or deceleration events and reduce, eliminate or disable one or more fuel shots associated with the fuel injection signal based upon just one of the various inputs thereto, or it may do so based upon a combination of such inputs, possibly even giving different weight to the different input values.

It is recognized and anticipated that ECM 56 may be designed to eliminate or disable one or more fuel injection shots only for the duration of the respective acceleration or deceleration event. As the engine catches up and is no longer accelerating or decelerating, whichever the case may be, the fuel injection signals may be returned to normal, that is, the disabled shot or shots are re-enabled, either gradually over a number of fuel injection signals, or more abruptly in a signal fuel injection event, or electronic control means 20 may keep one or more fuel injection shots disabled for a certain amount of time or until another predetermined criteria is satisfied.

It may be anticipated, as is evident from the foregoing description, that certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the present invention.

Other aspects, objects and advantages of the present invention can be obtained from a study of the drawings, the disclosure and the appended claims.

What is claimed is:

1. A method of controlling a fuel injection system, adapted to operate in at least a split injection mode and a boot injection mode, comprising:
   determining whether an acceleration condition exists,
   determining whether the fuel injection system is operating in a split injection mode; and
   if the fuel injection system is determined to be in a split injection mode and an acceleration condition exists, then rapidly changing from the split injection mode to a boot injection mode.

2. The method of claim 1, wherein the step of determining whether an acceleration condition exists is based upon one detecting an increase in rail pressure, detecting a change in engine speed, detecting a change in throttle actuation, and detecting a change in engine load.

3. The method of claim 1, wherein the rapid change occurs within one cylinder cycle for a particular cylinder.

4. The method of claim 1, wherein the rapid change occurs by modifying the timing or duration of at least one of a main fuel injection signal timing, a main fuel injection signal duration, an anchor fuel injection signal delay duration, an anchor fuel injection signal timing and an anchor fuel injection signal duration.

5. The method of claim 1, wherein the rapid change occurs within one engine cycle.

6. A method of controlling a fuel injection system, adapted to operate in at least a split injection mode and a boot injection mode, comprising:
   determining whether both a main fuel injection signal and an anchor fuel injection signal are provided by the fuel injection system;
   if both a main and an anchor fuel injection signal are provided, determining whether a rail pressure on acceleration (RPOA) is active;
   if active, assigning a main duration to a value based upon main duration RPOA and assigning an anchor delay to a value based upon anchor delay RPOA.

7. The method as recited in claim 6 wherein, if RPOA is not active, determining the main duration on the basis of map lookup as a function of engine conditions, and determining the anchor delay on the basis of map lookup as a function of engine conditions.

8. The method as recited in claim 6 wherein, if RPOA is not active, determining the main duration on the basis of a calculation based upon engine conditions, and determining the anchor delay on the basis of a calculation based upon engine conditions.

9. The method as recited in claim 6, wherein said engine conditions includes at least one of rail pressure, engine speed and engine load.

10. The method as recited in claim 6 wherein the main duration RPOA is a single configurable value.

11. The method as recited in claim 6 wherein the anchor duration RPOA is a single configurable value.

12. A method of controlling a fuel injection system to partition fuel output delivery to a plurality of direct fuel injection devices in an internal combustion engine comprising the steps of:

determining whether any of said plurality of direct fuel injection devices is currently operating in a boot or a split mode;

identifying an acceleration condition; and for injectors operating in a split mode, immediately modifying at least one of a corresponding main fuel injection signal timing, anchor delay signal timing and an anchor fuel injection timing to jump to a boot mode of operation.

13. A method of controlling a fuel injection system, comprising the steps of:

injecting a quantity of fuel in a split injection mode;

accelerating, at least in part by injecting a greater quantity of fuel; and switching from a split injection mode to a different injection mode if a determined anchor delay during the acceleration is less than a predetermined minimum anchor delay.

14. The method of claim 13 wherein the different injection mode is a boot injection mode.

15. A method of controlling a fuel injection system, comprising the steps of:

identifying a region of undesirable injector control signals for a split injection mode;

determining injector control signals for a subsequent injection event; and switching to a different injection mode if the determined injector control signals fall within the region of undesirable injector control signals.

16. The method of claim 15 including a step of conditioning performance of the switching step on a presence of an acceleration condition.

17. The method of claim 16 wherein the different injection mode is a boot injection mode.

18. A method of controlling a fuel injection system, comprising the steps of:

identifying a region of undesirable split injection characteristics;

determining subsequent split injection characteristics for a subsequent injection event; and switching to a different injection mode if the subsequent split injection characteristics fall within the region of undesirable split injection characteristics.

19. The method of claim 18 including a step of conditioning performance of the switching step on a presence of an acceleration condition.

20. The method of claim 19 wherein the different injection mode is a boot injection mode.

* * * * *